United States Patent

Hiruta et al.

[11] Patent Number: 5,248,110
[45] Date of Patent: Sep. 28, 1993

[54] VEHICLE SEAT BELT RETRACTOR

[75] Inventors: Mitsuhiko Hiruta; Yoshida Ryoichi, both of Shiga, Japan

[73] Assignee: Takata Corporation, Tokyo, Japan

[21] Appl. No.: 908,189

[22] Filed: Jul. 1, 1992

[30] Foreign Application Priority Data

Jul. 17, 1991 [JP] Japan .................. 2-291138

[51] Int. Cl.⁵ .................................. B60R 22/46
[52] U.S. Cl. ....................... 242/107; 280/806
[58] Field of Search ........ 242/107, 107.4 R, 107.4 B, 242/107.4 A; 280/806; 297/476, 477, 478, 480

[56] References Cited

U.S. PATENT DOCUMENTS

| | | | |
|---|---|---|---|
| 4,014,479 | 3/1977 | Nilsson et al. | 242/107.4 A X |
| 4,151,967 | 5/1979 | Lindblad | 280/806 X |
| 4,230,288 | 10/1980 | Fohl | 242/107 |
| 4,455,000 | 6/1984 | Nilsson | 242/107 X |
| 4,558,832 | 12/1985 | Nilsson | 242/107 |
| 4,597,586 | 7/1986 | Burghardt et al. | 280/806 |

FOREIGN PATENT DOCUMENTS 2505626 8/1976 Fed. Rep. of Germany .

*Primary Examiner*—John M. Jillions
*Attorney, Agent, or Firm*—Brumbaugh, Graves, Donohue & Raymond

[57] ABSTRACT

A vehicle seat belt pretensioner comprises a rotary piston/cylinder drive mechanism (4, 5) arranged to be coupled to a reel to rotate the reel in a direction to wind a seat belt onto it upon delivery into an annular cylinder chamber of the piston/cylinder of a gas under pressure from a gas generator (8). The drive mechanism includes a ratchet wheel (3) affixed to the reel and received rotatably within a cylindrical sleeve portion (51) of the piston (5) of the piston/cylinder. A locking bullet (7) is displaceably mounted in an opening in the sleeve portion of the piston for movement by the force due to gas under pressure supplied to the chamber from the gas generator generally radially from an outer inactive position in which rotation of the ratchet wheel and the reel are permitted to an inner locking position in which it engages a tooth of the ratchet wheel to couple the piston to the reel so as to rotate the reel in a direction to wind a length of the belt webbing onto the reel.

1 Claim, 2 Drawing Sheets

VEHICLE SEAT BELT RETRACTOR

BACKGROUND OF THE INVENTION

The present invention relates to a seat belt pretensioner and, in particular, to a pretensioner in which a length of the seat belt is wound onto a reel that is driven by a rotary piston/cylinder drive mechanism supplied with a gas under pressure from a gas generator.

It is well-known to equip vehicle seat belt systems with belt pretensioners that tighten a loosely fitting belt firmly against the occupant in a collision and more effectively restrain the occupant in the seat. Among the various types of pretensioners that have been proposed heretofore are those in which the reel of a seat belt retractor is rotated in the belt-winding direction to wind a length of the belt onto the reel by a turbine, a gear motor, or a rotary piston/cylinder powered by a gas under pressure supplied by a gas generator. The following references disclose seat belt pretensioners of this type:

Japanese Patent Publication No. 55-13736 ("Ref. 1");
Japanese Patent Publication No. 59-15657 ("Ref. 2");
Japanese Patent Laid-open Publication No. 54-142730 ("Ref. 3");
Japanese Patent Laid-open Publication No. 54-142731 ("Ref. 4");
Japanese Patent Laid-open Publication No. 60-45450 ("Ref. 5"); and
Japanese Patent Laid-open Publication No. 60-45449 ("Ref. 6");

When a belt pretensioner is built into a retractor, provision must be made for the retractor to operate normally in allowing the belt to be unwound from and wound onto the reel. Accordingly, the drive mechanism of the pretensioner cannot be engaged with the reel until the pretensioner is operated, and a device must be incorporated to connect the drive mechanism to the reel when the operation of the pretensioner is initiated.

Ref. 1 proposes a turbine impeller driven by gas under pressure to rotate the retractor reel, and while referring generally to a projecting fixed shaft, a slip joint or a friction coupling to connect the impeller to the reel, does not describe or show in detail such couplings. Ref. 2 discloses coupling the piston of a rotary piston/cylinder to the flange of a belt reel by a pin on the piston that is normally retracted into the cylinder chamber but is pushed by the gas pressure upon operation of the piston/cylinder into one of a series of holes arranged in a circle around the reel flange. In Refs. 3 and 4 rotating impeller is directly coupled to a reel, and there are no descriptions of how the retractor operates normally. The rotary piston/cylinder of the pretensioner of Refs. 5 and 6 is coupled to the reel shaft upon operation of the pretensioner by a ball and cam clutch mechanism.

The mechanism of Refs. 5 and 6 is of complicated design, requiring many parts and intricate assembly, and involves a series connection from the rotary piston/cylinder to the clutch to the reel, which undesirably increases the size of the retractor in the direction of the reel shaft. The mechanism of Ref. 2 is of a simpler design but is also of large size. Moreover, the pin on the piston does not normally register with and move into a hole in the reel flange until the piston has rotated through an idle distance, and the engagement is not certain and reliable because of the idling motion.

SUMMARY OF THE INVENTION

One object of the present invention is to provide an improved pretensioner of the type that uses a rotary piston/cylinder powered by gas under pressure from a gas generator to drive the belt reel that is of simple construction, can be manufactured and assembled at low cost, and is of small size. Another object is to provide such a pretensioner that is reliable in operation, particularly in ensuring engagement of the rotary piston with the belt reel shaft with very little idling rotation, if any, of the piston relative to the shaft.

The foregoing objects are attained, in accordance with the present invention, by a vehicle seat belt pretensioner having a reel, a seat belt webbing attached to the reel so as to be wound onto it upon rotation of the reel, and a rotary piston/cylinder drive mechanism arranged to be coupled to the reel to rotate the reel in a direction to wind the belt onto it upon delivery into an annular cylinder chamber of the piston/cylinder of a gas under pressure from a gas generator. The piston/cylinder includes a cylinder member having a cylindrical sleeve portion defining an outer wall of the chamber and a vane extending from the sleeve portion across the chamber and a piston member arranged to be coupled to the reel and having a cylindrical sleeve portion defining an inner wall of the chamber and a vane extending from the sleeve portion across the chamber.

The present invention is characterized in that the drive mechanism includes a ratchet wheel affixed to the reel, in that the cylindrical sleeve portion of the piston receives the ratchet wheel within it such that rotation of the ratchet wheel relative to the piston is normally permitted, in that the sleeve portion of the piston has an opening, and in that a locking bullet is displaceably mounted in the opening in the sleeve portion of the piston for movement by the force due to gas under pressure supplied to the chamber from the gas generator generally radially from an outer inactive position in which rotation of the ratchet wheel and the reel are permitted to an inner locking position in which it engages a tooth of the ratchet wheel to couple the piston to the reel so as to rotate the reel in a direction to wind a length of the belt webbing onto the reel.

The operation of a pretensioner according to the present invention is initiated by ignition of combustion of a combustible gas in a gas generator by an electric signal from an acceleration sensor. When the gas is introduced into the cylinder chamber of the rotary piston/cylinder, the pressure of the gas is applied to the locking bullet and acts over the area of the opening in the inner wall of the chamber in which the bullet is received, thereby producing a force on the bullet that pushes it inwardly into engagement with the ratchet wheel. The gas under pressure drives the piston in rotation, and the rotation of the piston is transferred to the ratchet wheel, and thus the belt reel to which it is attached, by the bullet. The rotation of the belt reel winds a length of the belt onto the reel, thereby tightening it firmly against the body of the seat occupant.

For a better understanding of the invention, reference may be made to the following description of an exemplary embodiment, taken in conjunction with the accompanying drawings.

DESCRIPTION OF THE EMBODIMENT

Figure 1:
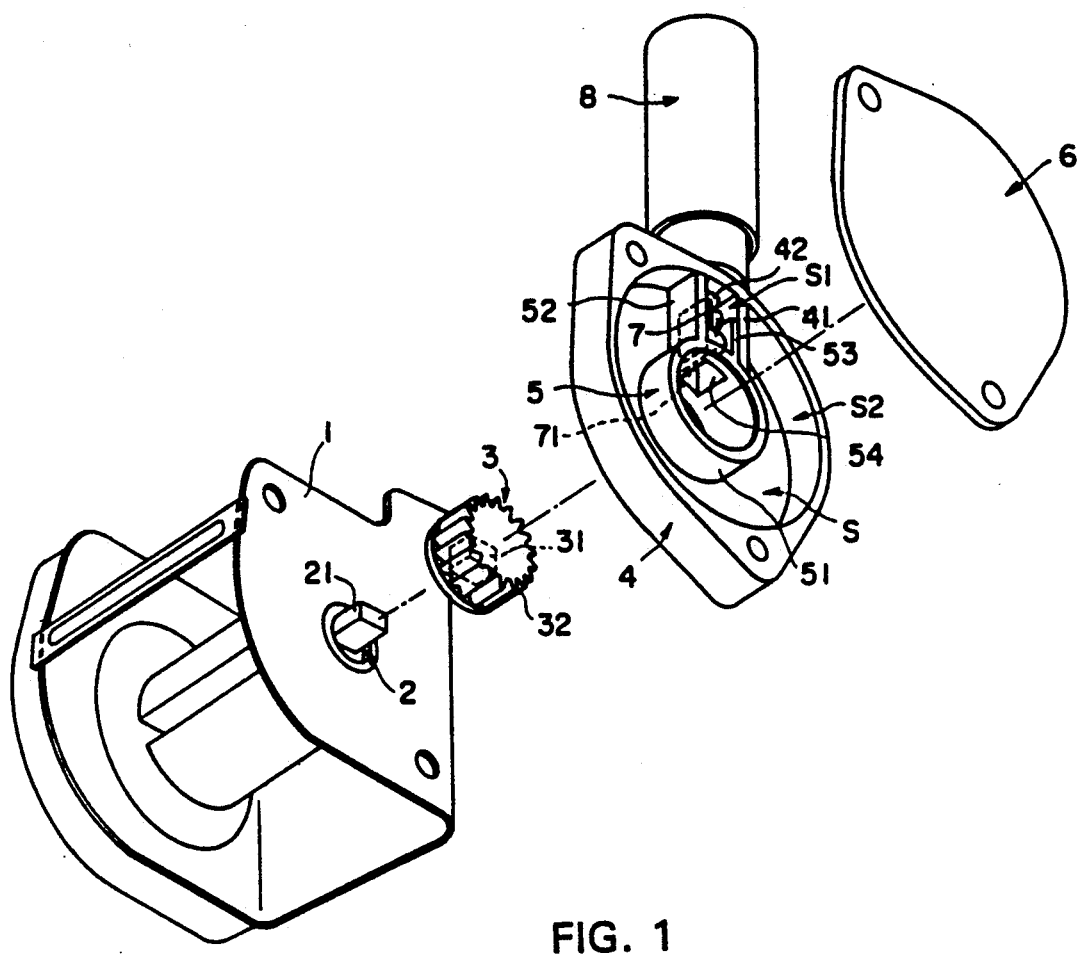
FIG. 1 is a perspective and partially exploded view of the embodiment.

The pretensioner mechanism is mounted on one side wall of a U-shaped frame 1, which is also the frame of a belt retractor of any suitable construction, many of which are known in the art. (In FIG. 1, the frame is shown rotated 180 degrees about the reel shaft, relative to FIGS. 2 to 4.) A belt reel shaft 2 mounted for rotation in the frame 1 has a rectangular extension 21 projecting out from the frame side wall that is received in a rectangular hole 31 in a ratchet wheel 3, which has ratchet teeth 32 on its outer periphery.

A cylinder member 4 mounted on the frame 1 by suitable fasteners, such as screws (not shown), has a circular cylindrical sleeve portion that is concentric with the reel shaft and forms the outer peripheral wall of an annular cylinder chamber S and a base wall that has a hole that receives the ratchet wheel. A partition wall in the form of a generally radially extending vane 41 extends across the chamber. Adjacent the vane 41 is a hole 42 through the peripheral sleeve portion of the cylinder member 4 through which gas from a gas generator 8 is conducted into the chamber. A piston member 5 is received on the ratchet wheel 3, a circular cylindrical sleeve portion 51 serving as a bearing that permits rotation of the ratchet wheel and as the inner wall of the chamber. A vane 52 extending generally radially from the sleeve portion is the piston of the rotary piston/cylinder. An end plate 6 forms the other side wall of the chamber. The vane 52 of the piston member and the vane 41 of the cylinder member divide the chamber S into a section S1 that communicates with the gas generator through the opening 42 and a section S2 that is isolated from the gas generator.

The sleeve portion 51 of the piston member has a rectangular hole 54 opening into the chamber section S1 adjacent the vane 52. A guide rib 53 extends outwardly from the sleeve portion 51 and defines with the vane 52 a guideway for a locking bullet 7 that is received in the hole 54. The tip 71 of the bullet is shaped to match the spaces between the ratchet teeth 32 of the ratchet wheel 3 and engages a ratchet tooth when the pretensioner operates, as described below. The teeth of the ratchet are inclined backwardly, opposite to the direction of rotation of the piston, thus facilitating smooth and certain movement of the bullet into engagement with a ratchet tooth and ensuring that the tip of the bullet remains engaged when the piston member 5 is rotated.

Figure 2:
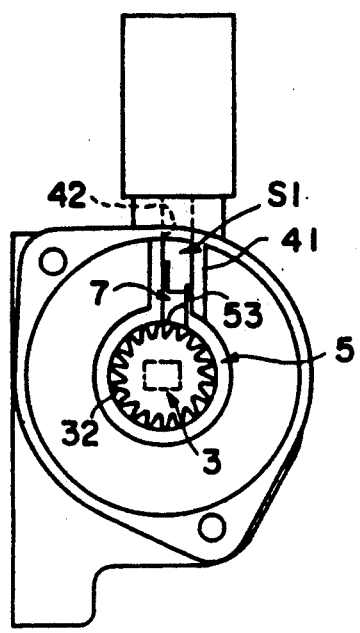
FIGS. 2 to 4 are side elevational views of the embodiment with the end wall plate of the cylinder chamber removed, showing it in different stages of operation.

In the "set" condition of the pretensioner, as shown in FIG. 2, the piston member 5 is positioned circumferentially so that the guide rib 53 is in contact with the vane 41 of the cylinder member 4, and the bullet 7 is retracted outwardly into the guideway within the hole so that its tip is clear of the ratchet teeth of the ratchet wheel 3. Those positions of the piston member and the bullet are held by a suitable releasable coupling, such as a shear pin (not shown), between the bullet and one of the fixed components of the piston/cylinder.

Figure 3:
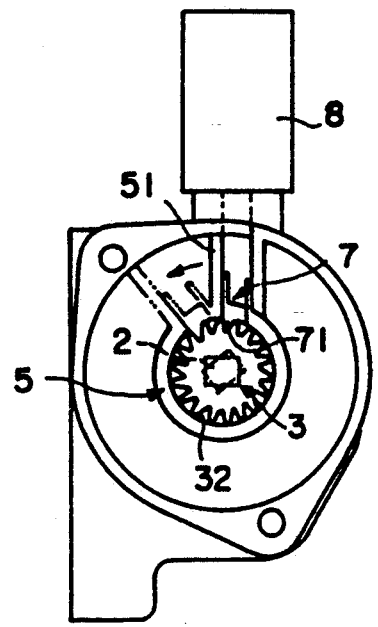
Figure 4:
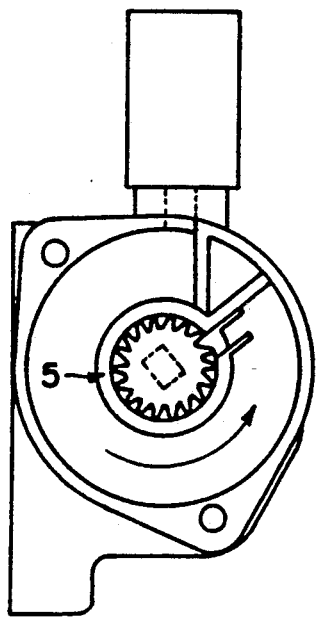

In the event of a collision of the vehicle that causes a predetermined level of acceleration, an acceleration sensor (not shown) generates an electrical signal, which is conducted to the gas generator and causes it to ignite and generate a gas under pressure. The gas enters the chamber section S1 of the rotary piston/cylinder through the opening 42. The difference in pressure between the gas in the section S1 and the air in the space within the sleeve portion 51 of the piston member 5 produces a force acting on the bullet 7 that pushes the bullet inwardly into engagement with a tooth 32 of the ratchet wheel 3, as shown in FIG. 3, thereby coupling the piston member 5 to the ratchet wheel. The gas supplied from the gas generator to the section S1 also produces a force on the vane 52, which drives the piston member and the ratchet wheel counterclockwise, as shown by the dashed lines in FIG. 3, and rotates the reel shaft 2 so as to wind a length of the seat belt onto the reel and thereby pull it firmly into engagement with the occupant. The reel shaft may be rotated through almost a complete revolution, i.e., up to the point when the vane 52 on the piston member encounters the vane 41 on the cylinder member, as shown in FIG. 4.

Thus, there is provided, in accordance with the invention, a seat belt pretensioner that achieves the objectives of ensuring reliable and rapid functioning to couple the rotary piston/cylinder mechanism to a reel onto which a length of belt is wound, of being of simple construction and economical to manufacture, and of being small in size.

We claim:

1. A vehicle seat belt pretensioner having a reel, a seat belt webbing attached to the reel and adapted to be wound onto it upon rotation of the reel, and a rotary piston/cylinder drive mechanism arranged to be coupled to the reel to rotate the reel in a direction to wind the belt onto it upon delivery into an annular cylinder chamber of the piston/cylinder of a gas under pressure from a gas generator, the piston/cylinder including a cylinder member having a cylindrical sleeve portion defining an outer wall of the chamber and a vane extending from the sleeve portion across the chamber and a piston member arranged to be coupled to the reel and having a cylindrical sleeve portion defining an inner wall of the chamber and a vane extending from the sleeve portion across the chamber, characterized in that the drive mechanism includes a ratchet wheel affixed to the reel, in that the cylindrical sleeve portion of the piston receives the ratchet wheel within it such that rotation of the ratchet wheel relative to the piston member is normally permitted, in that the sleeve portion of the piston has an opening, and in that a locking bullet is displaceably mounted in the opening in the sleeve portion of the piston for movement by the force due to gas under pressure supplied to the chamber from the gas generator generally radially from an outer inactive position in which rotation of the ratchet wheel and the reel are permitted to an inner locking position in which it engages a tooth of the ratchet wheel to couple the piston to the reel so as to rotate the reel in a direction to wind a length of the belt webbing onto the reel.

* * * * *